United States Patent
Okada et al.

(10) Patent No.: US 8,027,562 B2
(45) Date of Patent: Sep. 27, 2011

(54) METHOD AND APPARATUS FOR RECORDING IMAGES, METHOD AND APPARATUS FOR RECORDING AND REPRODUCING IMAGES, AND TELEVISION RECEIVER UTILIZING THE SAME

(75) Inventors: Shinichiro Okada, Toyohashi (JP); Shigeyuki Okada, Ogaki (JP); Noriaki Kojima, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1468 days.

(21) Appl. No.: 10/456,845

(22) Filed: Jun. 9, 2003

(65) Prior Publication Data

US 2004/0086264 A1    May 6, 2004

(30) Foreign Application Priority Data

Nov. 6, 2002   (JP) ................... 2002-170713

(51) Int. Cl.
    *H04N 9/80* (2006.01)
(52) U.S. Cl. .................. 386/241; 386/278; 386/282
(58) Field of Classification Search ............. 386/96, 386/95, 45–46, 125–126; 348/576, 578, 348/722, 699–700
    See application file for complete search history.

(56) References Cited

U.S. PATENT DOCUMENTS

| | | | | |
|---|---|---|---|---|
| 5,576,950 A | * | 11/1996 | Tonomura et al. | 386/121 |
| 5,787,414 A | * | 7/1998 | Miike et al. | 707/2 |
| 6,094,234 A | * | 7/2000 | Nonomura et al. | 348/700 |
| 6,427,048 B2 | * | 7/2002 | Ito et al. | 386/95 |
| 6,496,228 B1 | * | 12/2002 | McGee et al. | 348/700 |
| 6,778,223 B2 | * | 8/2004 | Abe | 348/559 |
| 6,829,301 B1 | * | 12/2004 | Tinker et al. | 375/240.12 |
| 2002/0135607 A1 | * | 9/2002 | Kato et al. | 345/716 |
| 2002/0135608 A1 | * | 9/2002 | Hamada et al. | 345/723 |
| 2003/0229894 A1 | * | 12/2003 | Okada et al. | 725/41 |

FOREIGN PATENT DOCUMENTS

| | | |
|---|---|---|
| JP | 11-213628 | 8/1999 |
| JP | 2001-111963 | 4/2001 |
| JP | 2001-204020 | 7/2001 |
| JP | P2001-177804 A | 8/2001 |
| JP | P2001-238167 A | 8/2001 |
| JP | 2002-247506 | 8/2002 |

OTHER PUBLICATIONS

Chinese Office Action for corresponding foreign patent application No. 03142588.7.

Japanese Office Action issued in corresponding Japanese Patent Application No. 2003-160352, dated May 2, 2006, along with Decision of Refusal dated Jan. 23, 2007.

* cited by examiner

*Primary Examiner* — Jamie Atala

(74) *Attorney, Agent, or Firm* — McDermott Will & Emery LLP

(57) ABSTRACT

An MPEG encoder performs, in compliance with the MPEG-2 standard, intra-image coding compression on thumbnail images, selected by an image selector, whose data amount has been reduced by a data reducing unit. The thus compressed thumbnail images together with a record address recorded as coded data in a coded image data area is recorded in a thumbnail image data.

4 Claims, 6 Drawing Sheets

METHOD AND APPARATUS FOR RECORDING IMAGES, METHOD AND APPARATUS FOR RECORDING AND REPRODUCING IMAGES, AND TELEVISION RECEIVER UTILIZING THE SAME

BACKGROUND OF THE INVENTION

1. Field of the Invention

The present invention relates to a technology for recording and reproducing images, and it particularly relates to a technique which records images that a user uses for the search of a desired scene among moving images.

2. Description of the Related Art

A method of recording moving images used increasingly in recent years is one using such recording medium as DVD (Digital Versatile Disc) or hard disk magnetic recording medium (hereinafter referred to simply as "hard disk" also), which facilitates random access to recorded data. Helped by the growing capacity of hard disks and the lowered price thereof, hard disk recorders, which are image recording/reproducing apparatus using hard disks, are now commercially available on the market. There are even cases where a hard disk recorder is built into a television receiver.

Such hard disk recorders, when using a hard disk with a recording capacity of about 80 GB, which can be obtained with relative ease today, can perform about 30 hours of recording with image quality equivalent to a common VTR (Video Tape Recorder). They can even accomplish close to 100 hours of recording if priority is given to the length of recording over image quality.

For an image recording/reproducing apparatus using a recording medium that facilitates random access to recorded data as mentioned above, there is a method using thumbnail images as a technology by which to search for a desired scene among the recorded moving images. In this technique, images, which have been selected at certain time intervals from moving images and reduced to a predetermined size, are displayed in an index in response to the request from the user.

SUMMARY OF THE INVENTION

A preferred embodiment according to the present invention relates to a apparatus for recording and reproducing. This apparatus includes: a decoder which acquires coded data and decodes moving images; and an index image generator which generates an index image used in finding a desired scene among the moving images, by referring to audio data.

DETAILED DESCRIPTION OF THE INVENTION

Figure 1:
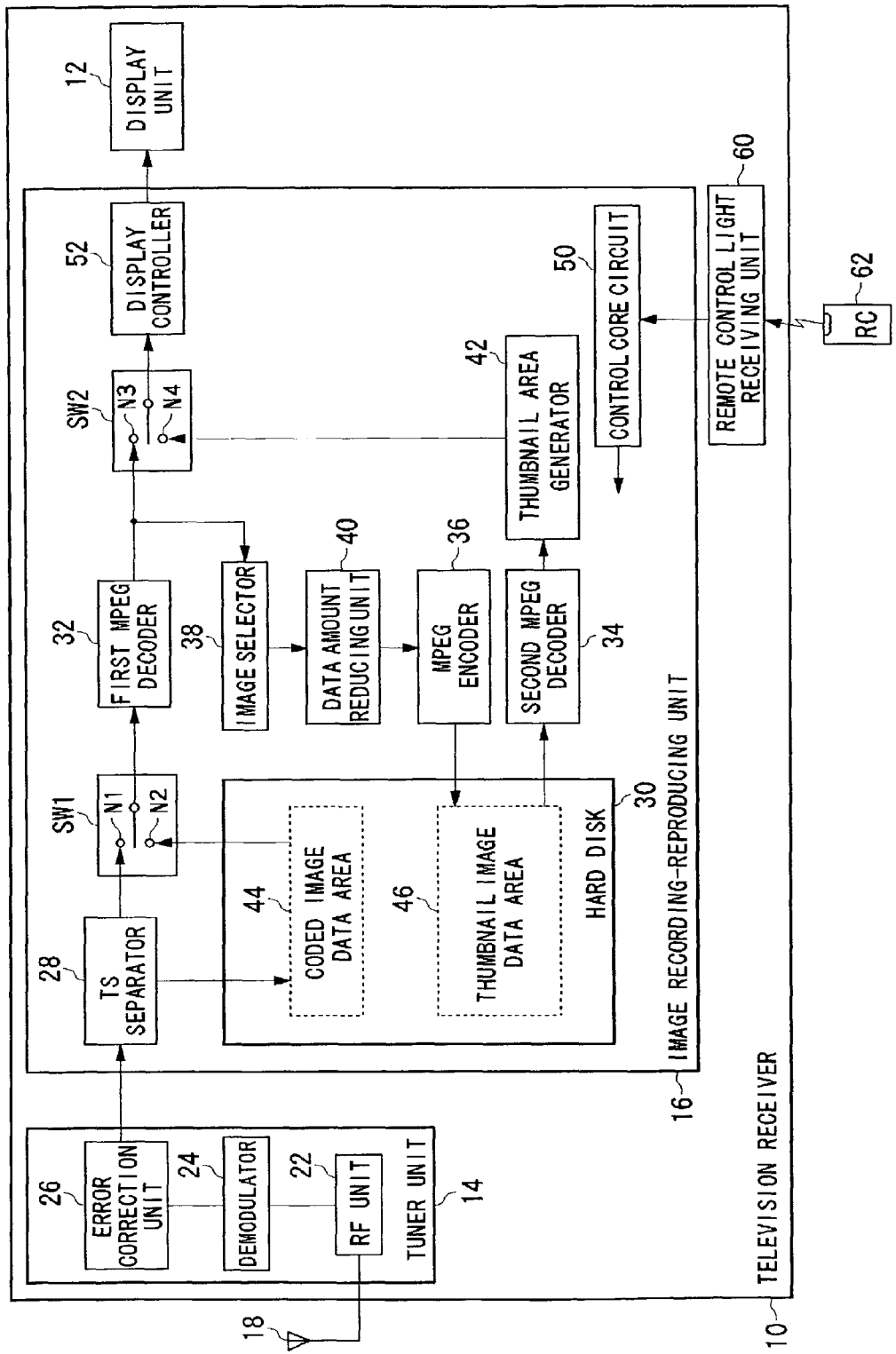
FIG. 1 is a block diagram showing a structure of a television receiver according to a first embodiment of the present invention.

A preferred embodiment according to the present invention relates to a method of recording images. This method includes: compressing a data amount of a reduced image utilized to search for a desired scene among moving images, by intra-image coding the reduced image; and recording the reduced image which has been intra-image coded, in a manner such that the reduced image is associated with an original image thereof.

Here, a method of generating the reduced images and a mode of reduction may be arbitrary. For example, the reduction may be done in a manner that the vertical length and the horizontal length of an image are reduced in the same ratio. Moreover, part of the image may be used. The audience of the moving images (hereinafter referred to also as "user") can search for a desired scene among the moving images, using this reduced image as a clue for the scene search. This reduced image may be called an "index image" or "thumbnail image."

Another preferred embodiment according to the present invention relates to apparatus for recording images. This apparatus includes: a reduced image coding unit which compresses a data amount of a reduced image utilized to search for a desired scene among moving images, by intra-image coding the reduced image; and an image recording unit which records the reduced image which has been intra-image coded by the reduced image coding unit, in a manner such that the reduced image is associated with an original image thereof. Still another preferred embodiment according to the present invention relates also to apparatus for recording and reproducing images. This apparatus includes: a first decoder which acquires coded data and decodes unit images that constitute moving images; a first data recorder which stores the coded data; an image selector which selects an original image of an index image used in the search of an desired scene among the moving images, from the unit images decoded by the first decoder; an index image generator which generates the index image by reducing the size of the selected original image; an encoder which compresses a data amount of the index image by intra-image coding the index image; a second data recorder which stores the coded index image in a manner such that the coded index image is associated with the original image; and a second decoder which selects a predetermined index image that is coded and stored in the second data recorder and which decodes the selected predetermined index image.

The first and second decoders may be combined into a single structure. Moreover, as the first and second data recorders, there are optical disk recording media, such as DVD, and hard disks and so forth.

The following (1) to (8) are some examples of timing for generating the index images. Namely, the index images may be generated at timing:

(1) of predetermined time intervals;
(2) based on a user's instruction;
(3) of a scene change in the moving images;
(4) of switching from a commercial message to a program;
(5) of a change of a display format;
(6) of index image acquisition points indicated by a creator of moving images;
(7) coupled with the top image of a chapter or an index image of the chapter if moving images are constituted by a plurality of chapters;

(8) of a change point of sound volume, for example, of a point where the sound volume changes greatly and abruptly; and so forth.

In the cases of above (1) to (3), the index images may be generated except for the scene of a commercial message. As an example of the change of the display format, there is a change from the 480 i format which is of effective pixels 720×480 and of an interlace frame, to the 720 p format which is of effective pixels 1280×720 and of a progressive frame. Said image selector may set the predetermined time intervals in accordance with a state prior to extraction of the original image of the index image. "A state prior to extraction of the original image of the index image" is, for instance, a recording time period for one recording instance, the kind of a program to be recorded, the remaining storage capacity, or a user's instruction when he or she reserves a recording.

Here, the index images may be generated while moving images that have been already recorded are being reproduced, or may be generated at the same time when moving images are recorded anew.

MotionJPG (Joint Photographic Coding Experts Group), MPEG-2 (Moving Picture Experts Group) and MPEG-4 may be used as methods of coding the moving images, but are not limited thereto. Moreover, as methods of compressing the index images, there are MPEG, JPEG, GIF (Graphics Interchange Format) and so forth.

When the moving images are to be recorded in an image recording/reproducing apparatus or the moving images recorded in the image recording/reproducing apparatus are to be reproduced, the index images are generated and coded and then recorded in the second data recorder at arbitrary intervals, at timing of a scene change or at audience-preferred timing. When instructed from the user, predetermined index images are selected from the thus recorded index images and then decoded. Here, the predetermined index images are, for example, ten images each for previous and after the currently displayed image that serves as a reference, or all of images that can be displayed in the order starting from the temporally oldest image, or the like. Moreover, if the first and the second decoders are combined into a single decoder, the index images are decoded utilizing an idling time period during which a processing for decoding the moving images is not performed. The index images are recorded in a manner such that they are associated with a record address of a recoding medium which has recorded coded image data, that are images before decoding, of their original images. Moreover, the image recording/reproducing apparatus may further include a scene determining unit which selects an image to be displayed from a record address associated with the index image selected by the user, and which moves the displayed scene of the moving images to the image to be displayed. In other words, the coded image data are decoded from a scene corresponding to the selected index image, and then the moving images are displayed.

Still another preferred embodiment according to the present invention relates also to apparatus for recording and reproducing images. This apparatus includes: first MPEG decoder which acquires coded data that are moving image signals coded in compliance with an MPEG standard, and which decodes unit images that constitute moving images; a first data recorder which stores the coded data; an image selector which selects an original image of an index image used in the search of a desired scene among the moving images, from the unit images decoded by the first MPEG decoder; an index image generator which generates an index image by reducing the size of the selected unit images; an MPEG encoder which intra-image codes the index image; a second data recorder which stores the coded index image in a manner such that the coded index image is associated with an original final image thereof; and a second MPEG decoder which decodes a predetermined index image.

Moreover, the image recording/reproducing apparatus may further include an index area generator which generates an index area that is structured by using the decoded index image.

Still another preferred embodiment according to the present invention relates to a television receiver. This television receiver includes: a tuner unit which receives television broadcast signal waves has been subject to a predetermined modulation, and which demodulates the signal wages into transport streams in which moving image signals coded in compliance with an MPEG standard are multiplexed; a TS separator which separates coded data of the moving image signals from the transport streams; a first MPEG decoder which acquires the coded data and decodes unit images that constitute the moving images; a first data recorder which stores the coded data; an image selector which selects an original image of an index image used in the search of a desired scene among the moving images, from the unit images decoded by the first MPEG decoder; an index image generator which generates an index image by reducing the size of the selected unit images; an MPEG encoder which intra-image codes the index image; a second data recorder which stores the coded index image in a manner such that the coded index image is associated with an original image thereof; a second MPEG decoder which decodes a predetermined index image; and a display controller which displays the index image.

MPEG-2 or MPEG-4 is assumed here as an MPEG format, but is not limited thereto. Moreover, there is MPEG-2 standard I picture as a format by which to code the index images.

Still another preferred embodiment according to the present invention relates also to a television receiver. This television receiver includes: a tuner unit which receives television broadcast signal waves that has been subject to a predetermined modulation, and which demodulates the signal waves into transport streams in which moving image signals coded in compliance with an MPEG standard are multiplexed; a TS separator which separates coded data of the moving image signals from the transport streams; a first MPEG decoder which acquires the coded data and decodes unit images that constitute the moving images; a first data recorder which stores the transport streams; an image selector which selects an original image of an index image used in the search of a desired scene among the moving images, from the unit images decoded by the first MPEG decoder; an index image generator which generates an index image by reducing the size of the selected unit images; an MPEG encoder which intra-image codes the index image; a second data recorder which stores the coded index image in a manner such that the coded index image is associated with an original image thereof; a second MPEG decoder which decodes a predetermined index image; and a display controller which displays the index image.

The assignee of the present invention has adopted the reverse reproduction technology proposed by Japanese Patent Application Laid-Open No. 2001-238167, and manufactured and marketed it as a single-chip LSI (Large-Scale Integration) circuit. This LSI is equipped with an MPEG-2 decoder capable of decoding 2-channel MPEG-2 streams and an MPEG encoder. The present invention can realize a low-cost production of apparatus as claimed, by utilizing this LSI. It is to be noted that any arbitrary combination of the above-described structural components and expressions changed between a method, an apparatus, a system, a recoding medium and so forth are all effective as and encompassed by the present embodiments.

The invention will now be described based on the following first to fifth embodiments which do not intend to limit the scope of the present invention but exemplify the invention. All of the features and the combinations thereof described in the embodiments are not necessarily essential to the invention.

In these preferred embodiments, when a program of digital television broadcast is recorded, the capacity required for recording thumbnail images is suppressed by preparing index images (hereinafter referred to simply as "thumbnail images") to be used in the search for a moving image scene and by carrying out an intra-image coding thereof.

The screen size for the NTSC (National Television System Committee) system, which is a common television broadcast system, is 720×480 pixels. Where the YUV, which is a standard for luminance (Y) and chromaticity (U, V), is 4:2:0 and the precision is 8 bits, the amount of data per screen is 720×480×8×(3×6/12)=approximately 4 megabits (500 kilobytes).

Suppose, for instance, that a one-hour program is recorded and thumbnail images are generated at 5-minute intervals. When the size of a thumbnail image is equal to one sixth of the display screen, the required capacity for recording is 1 megabyte, or 5 megabytes if the thumbnail images are generated at 1-minute intervals.

There is also a standard for digital television broadcast, called 1080 i, which is a format whose size is 1920×1080 pixels. The number of pixels is six times those of the above-mentioned screen size. Under the above-mentioned conditions, therefore, the capacity required for recording thumbnail images is 6 megabytes, or 30 megabytes if they are generated at 1-minute intervals.

The storage capacity of hard disks may keep increasing in the future, but preparing a large storage capacity for thumbnail images only may still raise the cost of the hard disks. Hence, it is possible to increase the product value by retaining as much capacity as possible for recording moving images and thereby lengthening the recording time.

According to the present embodiments, the data amount of thumbnail images is compressed by a technique in which special attentions are directed to the spatial frequency. To put it concretely, the thumbnail images are coded in compliance with I pictures of MPEG-2 standard, so as to compress the data amount thereof. By the compression using the I pictures of the MPEG-2 standard, the capacity required for recording thumbnail images can be reduced to 1/10 to 1/100 of the original requirement.

The structures that can realize the scene search as described above will be described in the following first to fifth embodiments. The apparatus assumed herein are a receiver of digital television broadcasts and a television receiver provided with an image recording device having a hard disk.

First Embodiment

FIG. 1 is a block diagram showing a structure of a television receiver 10 according to a first embodiment of the present invention. The television receiver 10 is comprised of a display unit 12, a tuner unit 14, an image recording/reproducing unit 16 and a remote control light receiving unit 60. The remote control light receiving unit 60 receives instructions to the television receiver 10, where the instructions are given by the operation of a remote controller (hereinafter abbreviated as "RC") by a user. The instruction thus received is sent as a control signal to the respective component units of the television receiver 10 via a control core circuit 50 described later.

The tuner unit 14 includes an RF (Radio Frequency) unit 22 which converts RF signals received by an antenna 18 into base band signals, a demodulator 24 which demodulates the base band signals thus obtained, and an error correction unit 26. Signals outputted from the tuner unit 14 are called a transport stream (hereinafter abbreviated as "TS"), in which moving image signals, audio signals and all the data used in data broadcast are multiplexed according to the digital television broadcast specifications.

The image recording/reproducing unit 16 includes a TS separator 28, a hard disk 30, a first MPEG decoder 32, a second MPEG decoder 34, an MPEG encoder 36, an image selector 38, a data amount reducing unit 40 and a thumbnail area generator 42. Moreover, the image recording/reproducing unit 16 may be manufactured and sold as a separate unit per se, instead of being so structured that the image recording/reproducing unit 16 is contained in the television receiver 10.

The TS separator 28 separates the multiplexed signals into signals corresponding to the different kinds of information contained in the TS, such as moving image signals and audio signals. Since this embodiment specifically concerns and is characterized by moving image signals, the following description will cover moving image signals only, and description of signals other than moving image signals, such as audio signals, will be omitted here. The moving image signals separated by the TS separator 28 are coded image data encoded in the MPEG2 format. The coded image data separated in the TS separator 28 are sent to the hard disk 30 and a first switch circuit SW1.

The hard disk 30 includes a coded image data area 44 which stores coded image data, and a thumbnail image data area 46 which stores reduced images to be used as thumbnail images after the reduced images are subjected to an intra-image coding. The first MPEG decoder 32 and the second MPEG decoder 34 decode the image data encoded in the MPEG2 format.

The image selector 38 selects images to be used as thumbnail images from the decoded moving images. The image selection is made at predetermined intervals or at the timing when there exists a scene change.

When the selection timing is predetermined time intervals, the time intervals are selected in accordance with a state prior to recording or a state with prior to selecting thumbnail images. Concretely the time intervals are selected from, for example, the following four conditions:

(1) The time intervals are set according to a recording time period for one recording instance. For example, if the recording periods are 30 minutes and 120 minutes, then the time intervals therefor will be 5 minutes and 15 minutes, respectively. Thereby, the exactly enough amount of images utilized for the thumbnail images can be selected as search points.

(2) The time intervals are set according to the kind of a program to be recorded. For example, if a sport program is to be recorded, the time intervals will be set to 15 minutes whereas if a drama program is to be recorded, the time intervals will be set to 5 minutes. The development of the program may be rather slow depending on programs and, in such a case, shortening the time intervals for the thumbnail images may result in selecting the points where the corresponding thumbnail images are not so effective as search points, so that the processing itself might be wasteful. Thus, the images used as the thumbnail images can be selected at time intervals most suitable for the kind of a program to be recorded, by setting the time intervals in accordance with the kind of a program.

(3) The time intervals are set according to the remaining storage capacity of the hard disk 30. For example, if there is quite a room left for the storage capacity of the hard disk 30, the time intervals will be set to 1 minute. And as the storage capacity becomes scarce, the time intervals will be set to 2, 5 and 10 minutes, for example. Thereby, the capacity shortage of the hade disk 30 during recording can be prevented.

(4) The time intervals are set when a user reserves a recording. Thus, the time intervals at which the thumbnail images are acquired can be determined according to a user's preference.

The image selector 38 may utilize, as the timing for selecting images used for the thumbnail images from the moving images decoded by the first MPEG decoder 32, the thumbnail image acquisition points indicated by a program transmitting side that is a contents provider. For example, the thumbnail image acquisition point is the timing at which each section of the program is started or title background is inserted or the like. More appropriate scene search can be realized by collecting the search points that the program transmitting sides intentionally selected.

If the program is constituted by a plurality of chapters, the image selector 38 may utilize the top image of each chapter as the thumbnail image. And if an index image is prepared in each chapter, the image selector 38 may utilize the index image as the thumbnail image. Thus, the audience can search for a desired scene while viewing the adjacent chapter image. Moreover, the audience can search for the desired scene after the search is done in the chapter screen, so that such two-step operations can be realized simultaneously.

The audience selects from the above-described conditions how the image selector 38 generates the thumbnail images at what timing, and the thus selected condition is set in the television receiver. The image selector 38 selects thumbnail images based on the condition set by the user.

The data amount reducing unit 40 converts the size of an image selected by the image selector 38 into a size adequate as a thumbnail image and thus reduces the data amount so as to generate a thumbnail image. At this time, not only the size but also the number of colors to be used may be reduced, for example, from 32 bits to 16 bits or 8 bits.

The MPEG encoder 36 performs a compression by intra-image coding on the thumbnail image which has been selected by the image selector 38 and whose data amount has been reduced by the data amount reducing unit 40. The compressed thumbnail image is recorded in the thumbnail image data area 46 together with the record address recorded in the coded image data area 44, as coded data prior to the decoding of the original image. Here, the image is coded and compressed by a compression technique using spatial frequency, or more specifically, in compliance with the I-pictures of the MPEG-2 standard. The thumbnail area generator 42 generates a thumbnail frame containing thumbnail images decoded by the second MPEG decoder 34.

The image recording/reproducing unit 16 further includes a first switch circuit SW1, a second switch circuit SW2, a control core circuit 50 and a display controller 52. The display controller 52 displays the thumbnail frame generated by the thumbnail area generator 42. At this time, the display may be the thumbnail frame only or the thumbnail frame together with the main screen. When a thumbnail frame is displayed together with a main screen, the main screen is converted to an appropriate size in order to secure an area for display of the thumbnail frame on the display screen.

The control core circuit 50 controls the operation of the components of the image recording/reproducing unit 16, of which the principal components are the first MPEG decoder 32, the second MPEG decoder 34, the MPEG encoder 36, the thumbnail area generator 42 and the display controller 52. A typical example of the control core circuit 50 is a CPU (Central Processing Unit). Various control instruction programs are stored in advance in ROM (Read Only Memory) or the like (not shown).

The first switch circuit SW1 switches input to the first MPEG decoder 32 according to the control by the control core circuit 50, thus switching the circuit to display either image data now being broadcast or image data recorded on the hard disk 30. At the point when connection on the first node N1 side is established, coded data which has been received by the tuner unit 14 and separated from the TS stream is sent to the first MPEG decoder 32. On the other hand, when connection on the second node N2 side is established, coded data is read out from the hard disk 30 and sent to the first MPEG decoder 32.

Similarly, the second switch circuit SW2 sends selectively the moving images decoded by the first MPEG decoder 32 and a thumbnail frame generated by the thumbnail area generator 42 to the display control unit 52 according to the control by the control core circuit 50. When connection of the third node N3 is established, the moving images decoded by the first MPEG decoder 32 are sent to the display control unit 52, and when connection of the fourth node N4 is established, the thumbnail frame is sent to the display control unit 52. Where the thumbnail frame is not displayed, connection is always established on the third node N3 side. Whenever a thumbnail frame display is requested by the user and also when an updating to a thumbnail frame containing other thumbnail images is requested by the user, connection of the fourth node N4 is established. Although not shown in FIG. 1, the apparatus according to this embodiment also includes a memory that functions as work area for the processings of the components thereof.

As has been described, according to the first embodiment, the capacity on a hard disk for recording thumbnail images can be reduced by compressing the thumbnail images. As a result thereof, the image recording/reproducing apparatus using the hard disk may be realized at low cost without the use of overly mass-storage hard disk. Moreover, such an image recording/reproducing apparatus can be built into a television receiver or the like at reasonable or minimum additional cost.

Second Embodiment

In the first embodiment, thumbnail images are generated at predetermined intervals or at the timing when there exists a scene change. In the second embodiment, thumbnail images are generated according to the instructions from the user.

Figure 2:
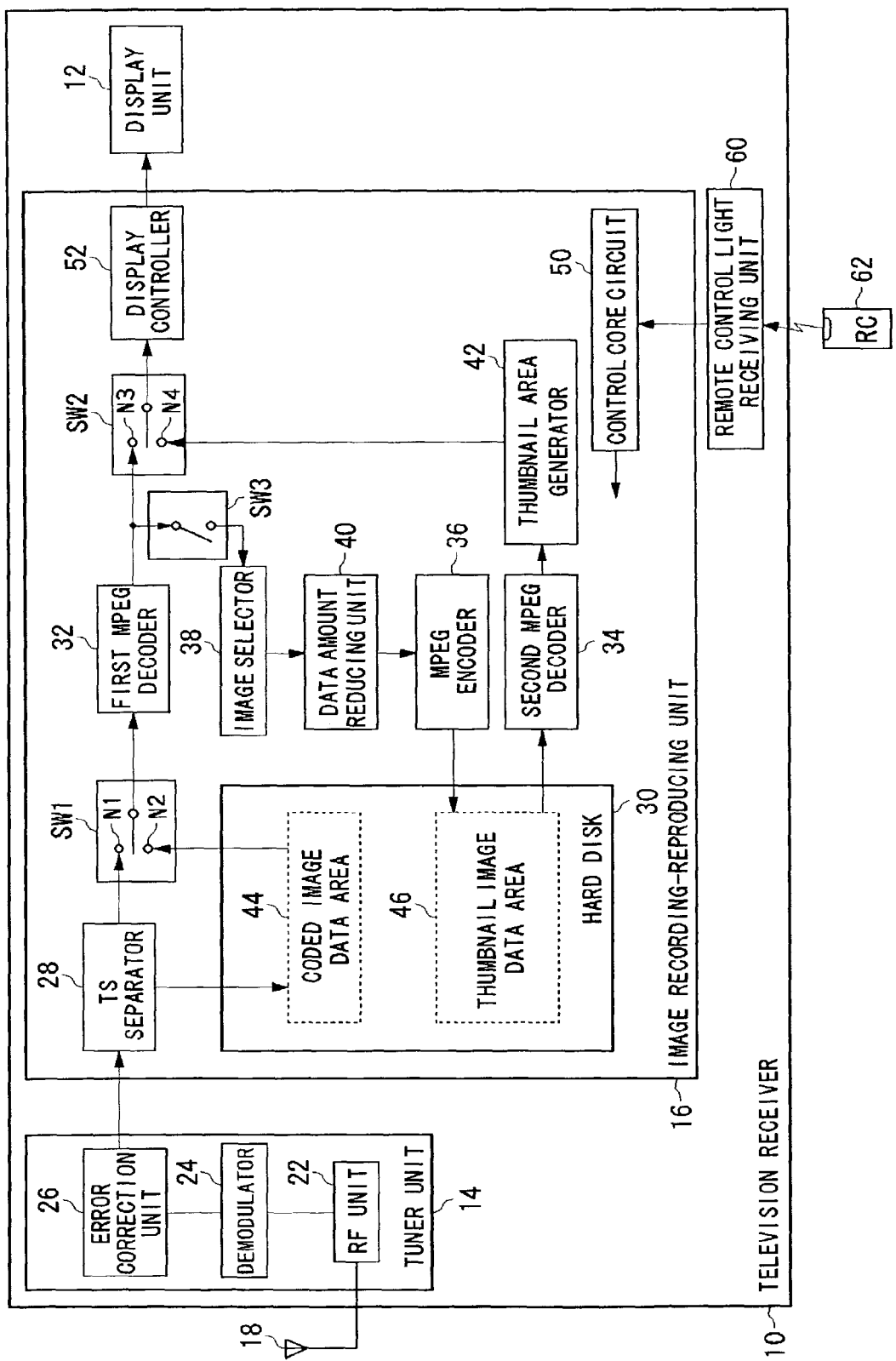
FIG. 2 is a block diagram showing a structure of a television receiver according to a second embodiment of the present invention.

FIG. 2 is a block diagram showing a structure of a television receiver 10 according to a second embodiment of the present invention. Since the structure has much similarity to that of the image recording/reproducing unit 16 shown in FIG. 1, the points characteristic of the second embodiment only will be described hereunder.

In the second embodiment, a third switch circuit SW3 is provided on the signal route from the first MPEG decoder 32 to the image selector 38. The user instructs the timing for the generation of a thumbnail image by the use of the RC 62 while checking on the main image.

When the instruction is given, the third switch circuit SW3 turns on and the image selector 38 selects and extracts the original image of the thumbnail image. The processings from here on are the same as those of the first embodiment.

According to the second embodiment, not only the advantages of the first embodiment can be derived, but also the scenes desired by the user can be recorded as thumbnail images.

Third Embodiment

In the first and second embodiments, the second MPEG decoder 34 is used to decode thumbnail images. In the third embodiment, however, the first MPEG decoder 32 and the second MPEG decoder 34 are combined into a single MPEG decoder.

Figure 3:
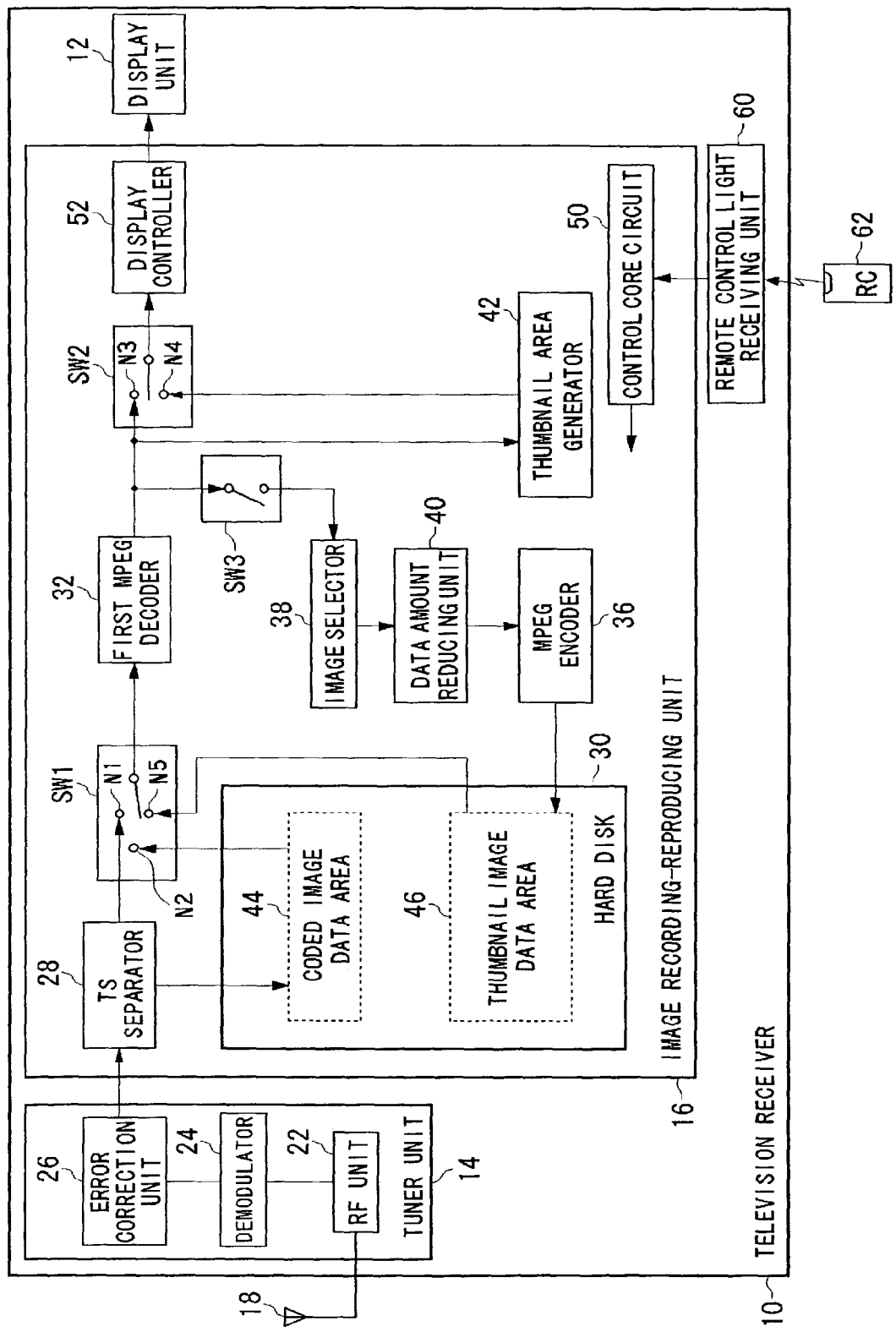
FIG. 3 is a block diagram showing a structure of a television receiver according to a third embodiment of the present invention.

FIG. 3 is a block diagram showing a structure of a television receiver 10 according to a third embodiment of the present invention. The second MPEG decoder 34 in the image recording/reproducing unit 16 as shown in FIG. 2 is omitted, and a first MPEG decoder 32 performs the function of the second MPEG decoder 34 as mentioned above. In particular, when moving images and thumbnail images are decoded, that is, when moving images and a thumbnail frame are displayed simultaneously on the same screen, those coded data are decoded in a time-sharing manner.

Moreover, the first switch circuit SW1 further includes a fifth node N5. When moving images are displayed by decoding the coded image data recorded in the coded image data area 44 of the hard disk 30, connection is established on the second node N2 side of the first switch circuit SW1 and on the third node N3 side of the second switch circuit SW2 according to the control by the control core circuit 50. Moreover, when thumbnail images are decoded, connection is established simultaneously on the fifth node N5 side of the first switch circuit SW1 and on the fourth node N4 side of the second switch circuit SW2.

According to the third embodiment, not only the advantages of the first and second embodiments can be derived, but also the present invention can be realized at low cost provided that the apparatus is already equipped with an MPEG-2 decoder capable of decoding two channels of MPEG-2 streams.

Fourth Embodiment

In the first to third embodiments, data to be recorded on the hard disk 30 is coded data which has once been separated from the TS by the TS separator 28. In the fourth embodiment, however, TS is recorded as it is on the hard disk 30. The area where TS is recorded within the recording area of the hard disk 30 is called a TS data area 66, which corresponds to the coded image data area 44 in the first to third embodiments.

Figure 4:
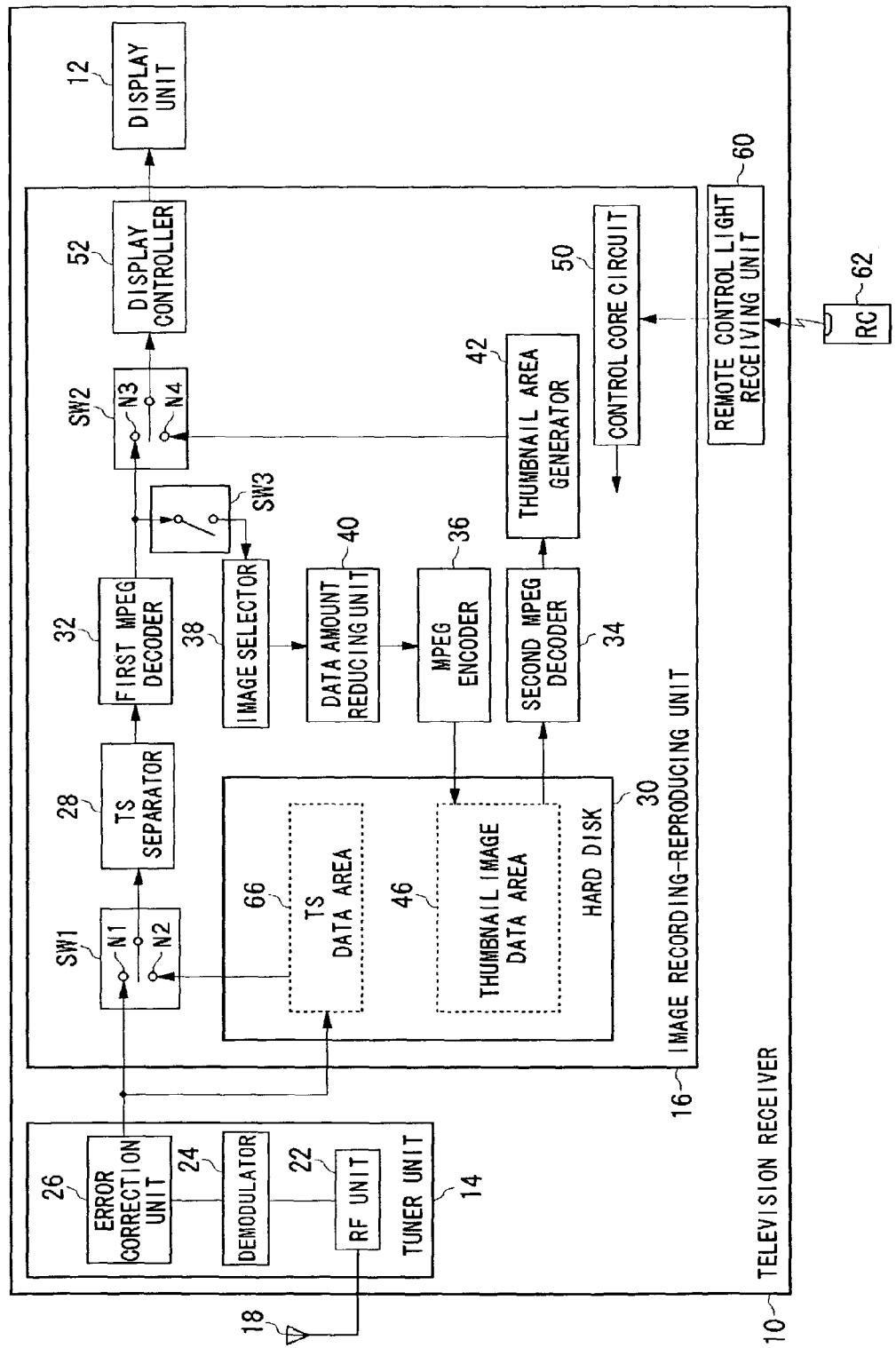
FIG. 4 is a block diagram showing a structure of a television receiver according to a fourth embodiment of the present invention.

FIG. 4 is a block diagram showing a structure of a television receiver 10 according to a fourth embodiment of the present invention. Since this structure has much similarity to that of the television receiver 10 shown in the second embodiment, the points characteristic of the fourth embodiment only will be described hereunder.

The hard disk 30 is provided with the TS data area 66, where TS is recorded, in substitution for the coded image data area 44 where coded data separated from TS is recorded. Moreover, the first switch circuit SW1 is placed before the TS separator 28, that is, on the side of the tuner unit 14. By the operation of this first switch circuit SW1, either of the TS being received by the tuner unit 14 and the TS recorded in the TS data area 66 is selected and sent to the TS separator 28.

In the fourth embodiment, TS is recorded in the TS data area 66 of the hard disk 30 as a modification of the structure of the second embodiment. It goes without saying that the structure of the first and the third embodiment may be so changed as to allow the recording of TS in the TS data area 66 of the hard disk 30.

Fifth Embodiment

In the first embodiment, the timing for generating the thumbnail images is obtained by, for example, referring to images decoded by the first MPEG decoder 32. In this fifth embodiment, the timing for generating the thumbnail images is a point where audio data changes greatly or abruptly.

Figure 6:
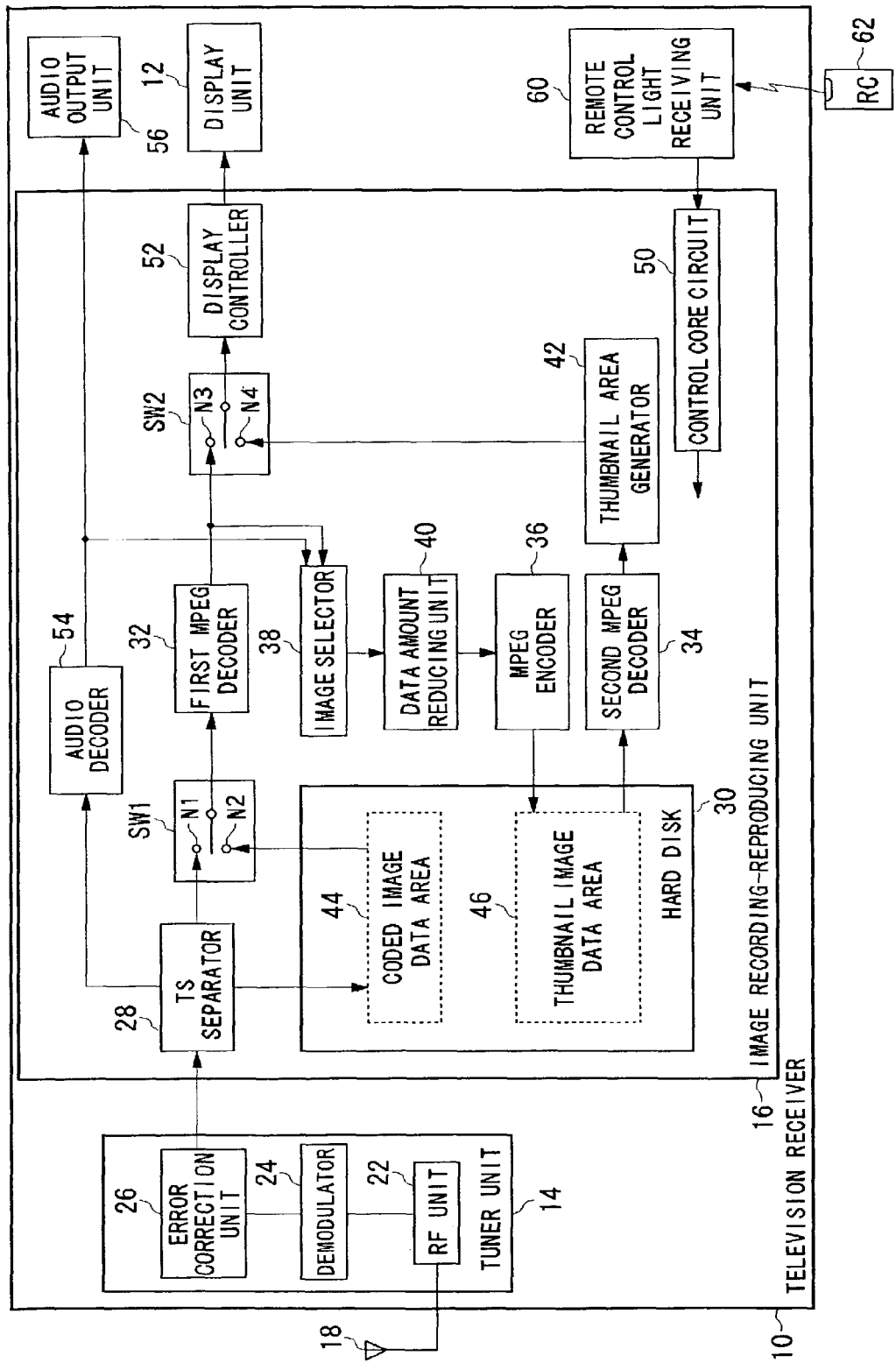
FIG. 6 is a block diagram showing a structure of a television receiver according to a fifth embodiment of the present invention.

FIG. 6 is a block diagram showing a structure of a television receiver 10 according to a fifth embodiment of the present invention. Since this structure has much similarity to that of the television receiver 10 shown in the first embodiment, the points characteristic of the fifth embodiment only will be described hereunder.

A television receiver 10 includes an audio decoder 54 which decodes coded audio data separated by the TS separator 28 and an audio output unit 56 which outputs the decoded audio data to an external unit. If the audio data are coded in compliance with the MPEG-2 standard and the processing capacity of a first MPEG decoder 32 is large, the first MPEG decoder 32 may serve the function of the audio decoder 54. It is to be noted here that the audio decoder 54 and the audio output unit 56 are originally provided in the television receiver 10 according to the first to fourth embodiments, however, these elements 54 and 56 are omitted then for the sake of brevity.

The audio data decoded by the audio decoder 54 are sent to an image selector 38 and the audio output unit 56. The image selector 38 refers to the audio data and determines, as timing for selecting the thumbnail images, a point at which the audio data changes greatly or abruptly. Based on the timing thus determined, the image selector 38 selects images to be utilized as thumbnail images, from the moving images decoded by the first MPEG decoder 32. The structure of the fifth embodiment may be so changed as to allow the recording of TS in the TS data area 66 of the hard disk 30 as the fourth embodiment.

In terms of hardware, the above-described structure can be realized by a CPU, a memory and other LSIs of an arbitrary computer. In terms of software, it is realized by memory-loaded programs or the like, but drawn and described here are function blocks that are realized in cooperation with those. Thus, it is understood by those skilled in the art that these function blocks can be realized in a variety of forms by hardware only, software only or the combination thereof.

The present invention has been described based on the embodiments which are only exemplary. It is understood by those skilled in the art that there exist other various modifications to the combination of each component and process described above and that such modifications are encompassed by the scope of the present invention.

In the present embodiments, thumbnail images are subjected to an intra-image coding, but a generated thumbnail frame may also be coded and stored. In this case, thumbnail images are not recorded in order to secure the recording capacity. Furthermore, the compression technique for thumbnail frames should not be limited to that using MPEG; instead, JPEG, GIF, LZW (Lempel-Ziv-Weich) and other compression techniques may be used also.

Figure 5:
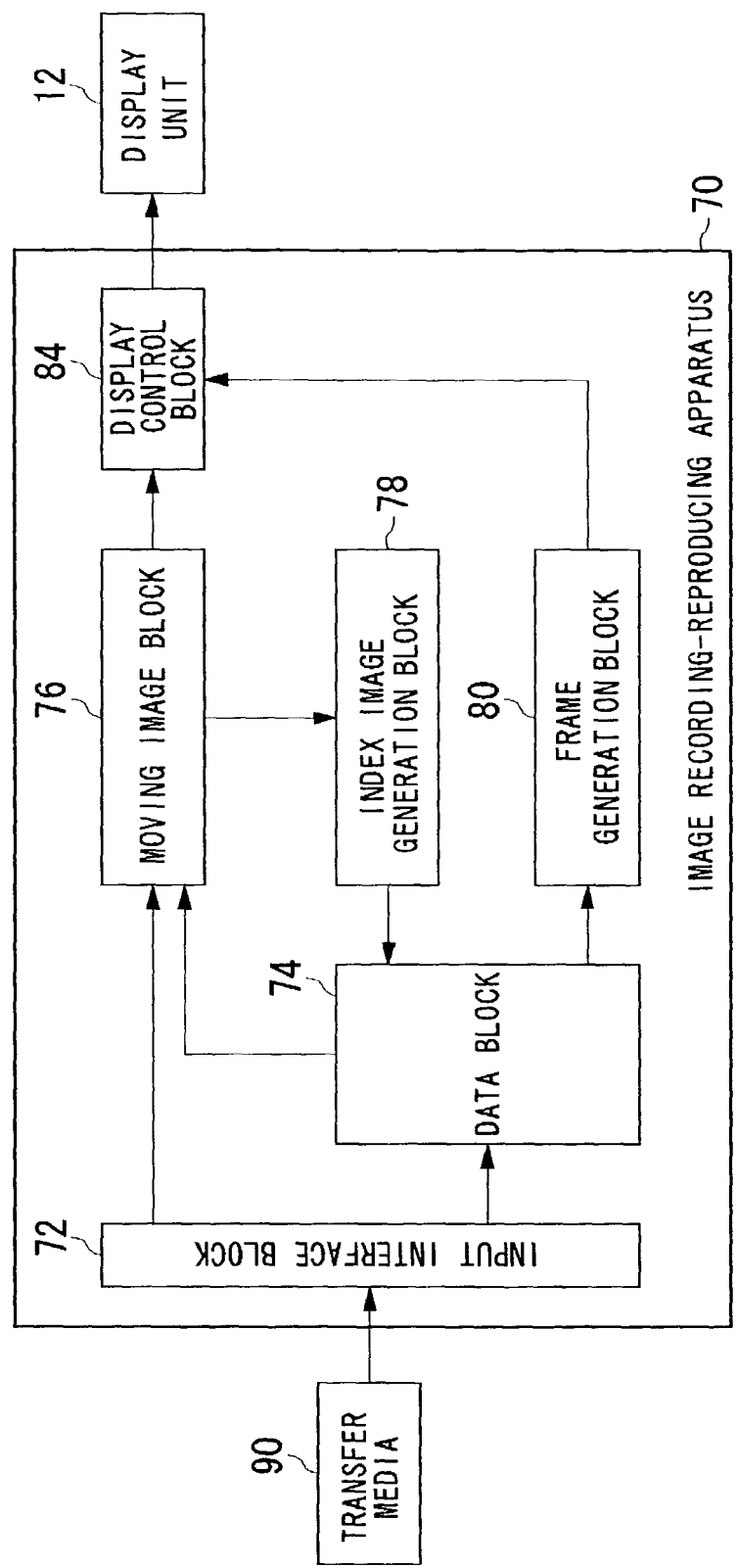
FIG. 5 shows a structure of the function blocks of an image recording/reproducing apparatus of the present invention as a modified example structured from a different point of view.

FIG. 5 shows a structure of the function blocks of an image recording/reproducing apparatus 70 by viewing the present invention from a different point of view. The image recording/reproducing apparatus 70 is comprised of an input interface block 72, a data block 74, a moving image block 76, an index image generation block 78, a frame generation block 80 and a display control block 84.

Hereinbelow, a description is given of the principal correspondence between the components of the image recording/reproducing unit 16 described in the first to fifth embodiments and those of the image recording/reproducing apparatus 70 shown in FIG. 5. The moving image block 76 corresponds to the first MPEG decoder 32, and the data block 74 corresponds to the hard disk 30. The index image generation block 78 corresponds to the image selector 38, the data amount reducing unit 40 and the MPEG encoder 36. The frame generation block 80 corresponds to the second MPEG decoder 34 and the thumbnail area generator 42, and the display control block 84 corresponds to the display controller 52 and the second switch circuit SW2. It is to be noted that, though not shown in FIG. 5, the component blocks perform their respective functions jointly with a predetermined control circuit, such as a CPU, which corresponds to the control core circuit 50. Moreover, in a similar manner, the component blocks thereof perform their functions in linkage with one another.

The input interface block 72 receives coded data from a transfer medium 90. The coded data is either sent to the moving image block 76 or recorded in the data block 74. The index image generation block 78 selects images to be used as thumbnail images, from the moving images decoded by the moving image block 76, generates and codes thumbnail images and records the thus coded thumbnail images in the data block 74.

The frame generation block 80 decodes predetermined thumbnail images and generates a thumbnail frame in such a manner that the temporal relationship of the thumbnail images with moving images is recognizable. The generated thumbnail frame is displayed independently or together with moving images on the display unit 12 by the operation of the display control block 84. Moreover, the frame generation block 80 updates the thumbnail frame at predetermined update timing. It is to be noted here that the transfer medium 90 may be a storage medium such as DVD, or a broadcast medium such as ground wave, satellite broadcast or CATV.

Although the present invention has been described by way of exemplary embodiments, it should be understood that many changes and substitutions may further be made by those skilled in the art without departing from the scope of the present invention which is defined by the appended claims.

What is claimed is:

1. An apparatus for recording and reproducing, comprising:
    a decoder which acquires coded data for television broadcast and decodes moving images; and
    an index image generator which generates an index image used in finding a desired scene among the moving images, by referring to audio data and selecting a unit image constituting the moving image decoded by the decoder at a timing when sound volume thereof is increased irrespective of whether a scene change occurs; and
    a display controller which displays a thumbnail frame comprising the index image generated by the index image generator, together with moving images on a display screen,
    wherein the display controller displays the thumbnail frame on the display screen updating the thumbnail frame at a predetermined timing schedule such that temporal relationship of the thumbnail frame with moving images displayed on the same display screen is recognizable.

2. An apparatus for recording and reproducing, comprising:
    a decoder which acquires coded data for television broadcast and decodes moving images; and
    an index image generator which generates an index image used in finding a desired scene among the moving images, by referring to audio data and selecting a unit image constituting the moving images decoded by the decoder at timing when sound volume thereof greatly changes irrespective of whether a scene change occurs; and
    a display controller which displays a thumbnail frame comprising the index image generated by the index image generator, together with moving images on a display screen,
    wherein the display controller displays the thumbnail frame on the display screen updating the thumbnail frame at a predetermined timing schedule such that temporal relationship of the thumbnail frame with moving images displayed on the display screen is recognizable.

3. Apparatus for recording and reproducing according to claim 1, wherein the index image generator generates the index image, excluding the scene of a commercial message.

4. Apparatus for recording and reproducing according to claim 2, wherein the index image generator generates the index image, excluding the scene of commercial message.

* * * * *

UNITED STATES PATENT AND TRADEMARK OFFICE
CERTIFICATE OF CORRECTION

| | | |
|---|---|---|
| PATENT NO. | : 8,027,562 B2 | Page 1 of 1 |
| APPLICATION NO. | : 10/456845 | |
| DATED | : September 27, 2011 | |
| INVENTOR(S) | : Shinichiro Okada et al. | |

It is certified that error appears in the above-identified patent and that said Letters Patent is hereby corrected as shown below:

On the title page item (30) Foreign Application Priority Data, the foreign priority date is listed incorrectly. The date currently reads Nov. 6, 2002 but it should read June 11, 2002.

Signed and Sealed this
Twenty-fifth Day of September, 2012

David J. Kappos
*Director of the United States Patent and Trademark Office*